(12) United States Patent
Pal

(10) Patent No.: US 10,871,334 B2
(45) Date of Patent: Dec. 22, 2020

(54) HEAT EXCHANGERS WITH MULTI-LAYER STRUCTURES

(71) Applicant: Hamilton Sundstrand Corporation, Charlotte, NC (US)

(72) Inventor: Debabrata Pal, Hoffman Estates, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1776 days.

(21) Appl. No.: 13/934,362

(22) Filed: Jul. 3, 2013

(65) Prior Publication Data

US 2015/0007969 A1 Jan. 8, 2015

(51) Int. Cl.
| F28F 3/14 | (2006.01) |
| F28F 3/12 | (2006.01) |
| F28F 3/02 | (2006.01) |
| B23P 15/26 | (2006.01) |

(52) U.S. Cl.
CPC .................. *F28F 3/12* (2013.01); *F28F 3/02* (2013.01); *B23P 15/26* (2013.01); *Y10T 29/4935* (2015.01)

(58) Field of Classification Search
CPC ............ H05K 7/20154; H05K 7/20254; H01L 23/3672; H01L 23/427; H01L 23/467
USPC ...................... 165/80.4, 109.1, 170; 361/699
See application file for complete search history.

(56) References Cited

U.S. PATENT DOCUMENTS

| 5,381,859 A * | 1/1995 | Minakami et al. ....... F28F 3/02 165/185 |
| 7,614,247 B2 * | 11/2009 | Nicolai et al. ..... H05K 7/20772 165/80.4 |
| 8,136,577 B2 * | 3/2012 | Edward .............. H05K 7/20154 165/80.3 |
| 8,522,861 B2 * | 9/2013 | Zaffetti ................. H01L 23/473 165/80.4 |
| 10,682,734 B2 * | 6/2020 | Andersen ................ B23P 15/26 |
| 2003/0024693 A1 * | 2/2003 | Petty ..................... H01L 23/467 165/121 |
| 2006/0237166 A1 * | 10/2006 | Otey et al. ................ F28F 3/02 165/80.4 |
| 2008/0149313 A1 * | 6/2008 | Slaughter ................ F28F 13/06 165/148 |
| 2010/0071887 A1 * | 3/2010 | Sugiyama ............. F28D 9/0037 165/166 |
| 2010/0157540 A1 * | 6/2010 | Yu ......................... H01L 23/433 361/710 |
| 2015/0007969 A1 * | 1/2015 | Pal ........................... F28F 3/12 165/166 |
| 2015/0137412 A1 * | 5/2015 | Schalansky ............ B33Y 10/00 264/129 |

(Continued)

*Primary Examiner* — Claire E Rojohn, III
(74) *Attorney, Agent, or Firm* — Locke Lord LLP; Scott D. Wofsy; Georgi Korobanov

(57) ABSTRACT

A heat exchanger includes a pair of opposed, spaced apart heat exchanger plates defining a heat exchanger volume therebetween having an inlet and opposed outlet. A plurality of heat exchanger ribs are included within the heat exchanger volume. Each rib defines a rib body spanning the heat exchanger volume. Each rib body includes a plurality of slits therethrough to define a flow path through the heat exchanger ribs from the inlet to the outlet of the heat exchanger volume. The ribs and slits can be formed using ultrasonic additive manufacturing (UAM), for example.

14 Claims, 3 Drawing Sheets

(56) References Cited

U.S. PATENT DOCUMENTS

| | | | |
|---|---|---|---|
| 2015/0290711 A1* | 10/2015 | Norfolk | B23K 35/0255 |
| | | | 425/78 |
| 2015/0352661 A1* | 12/2015 | Karlen | B33Y 80/00 |
| | | | 428/586 |
| 2018/0252128 A1* | 9/2018 | Rossignol | B29C 66/242 |
| 2018/0345425 A1* | 12/2018 | Caimano | B22F 5/106 |
| 2019/0257581 A1* | 8/2019 | Wray | F26B 17/02 |

* cited by examiner

HEAT EXCHANGERS WITH MULTI-LAYER STRUCTURES

BACKGROUND OF THE INVENTION

1. Field of the Invention

The present invention relates to heat exchangers, and more particularly to heat exchangers for liquid cooled motor controllers, for example.

2. Description of Related Art

Traditional cold plates used in liquid cooled motor controllers are made by vacuum brazing processes. There are known issues with brazing if process parameters are not well controlled. Examples include warped surfaces as well as melted and deformed fin cores. These result in higher pressure drops and reduced thermal performance.

Such conventional methods and systems have generally been considered satisfactory for their intended purpose. However, there is still a need in the art for heat exchangers that allow for improved manufacturability and performance. There also remains a need in the art for such heat exchangers that are easy to make and use. The present disclosure provides a solution for these problems.

SUMMARY OF THE INVENTION

A heat exchanger includes a pair of opposed, spaced apart heat exchanger plates defining a heat exchanger volume therebetween having an inlet and opposed outlet. A plurality of heat exchanger ribs are included within the heat exchanger volume. Each rib defines a rib body spanning the heat exchanger volume. Each rib body includes a plurality of slits therethrough to define a flow path through the heat exchanger ribs from the inlet to the outlet of the heat exchanger volume.

In certain embodiments, each rib includes a plurality of additive manufacturing layers aligned with a flow direction defined through the slits thereof. For example, each rib can include a plurality of ultrasonic additive manufacturing layers aligned with a flow direction defined through the slits thereof.

In another aspect, each of the slits can be substantially rectangular. The slits in each rib can define a rectangular array of slits. For example, the rectangular array can include nine slits in a three by three array, or twelve substantially rectangular slits longitudinally aligned in a four by three array four slits wide along a direction defined by long sides of the substantially rectangular slits. Each rib can have a thickness in a flow direction defined through the slits thereof, and the ribs can be spaced apart from one another in the flow direction by a distance substantially equal to the rib thickness. Each slit in each rib can aligned with a corresponding slit in each of the other ribs. It is also contemplated that each slit in each rib can be out of alignment with a corresponding slit in adjacent ribs.

A cold plate for a liquid cooled motor controller includes a cold plate body defining a plurality of cooling channels. A heat exchanger as described above is defined in the cold plate body with the inlet of the heat exchanger in fluid communication with a first one of the cooling channels and with the outlet of the heat exchanger in fluid communication with a second one of the cooling channels for cooling of the cold plate body by circulation of fluid through the cooling channels and heat exchanger.

In certain embodiments, the heat exchanger is a first heat exchanger and the cold plate further includes a second heat exchanger as described above defined in the cold plate body. A third one of the cooling channels is in fluid communication with the outlet of the second heat exchanger, and the second cooling channel connects the outlet of the first heat exchanger in fluid communication and in series with the inlet of the second heat exchanger.

It is also contemplated that the second heat exchanger can be connected in parallel with the first heat exchanger. For example, the first cooling channel can be in fluid communication with the inlets of both heat exchangers in parallel, and the second cooling channel can be in fluid communication with the outlets of both heat exchangers in parallel.

A method of making a heat exchanger as described above includes forming the plurality of heat exchanger ribs using additive manufacturing. A plurality of layers are successively deposited, and in certain embodiments machined, to form the rib bodies and slits.

In certain embodiments, the method further includes mounting the heat exchanger to a cold plate for cooling a motor controller, i.e. the heat exchanger and cold plate are formed separately and then are joined together. It is also contemplated that the method can include integrally forming cold plate for cooling a motor controller wherein the cold plate and heat exchanger are integrally formed together in a single additive manufacturing process.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
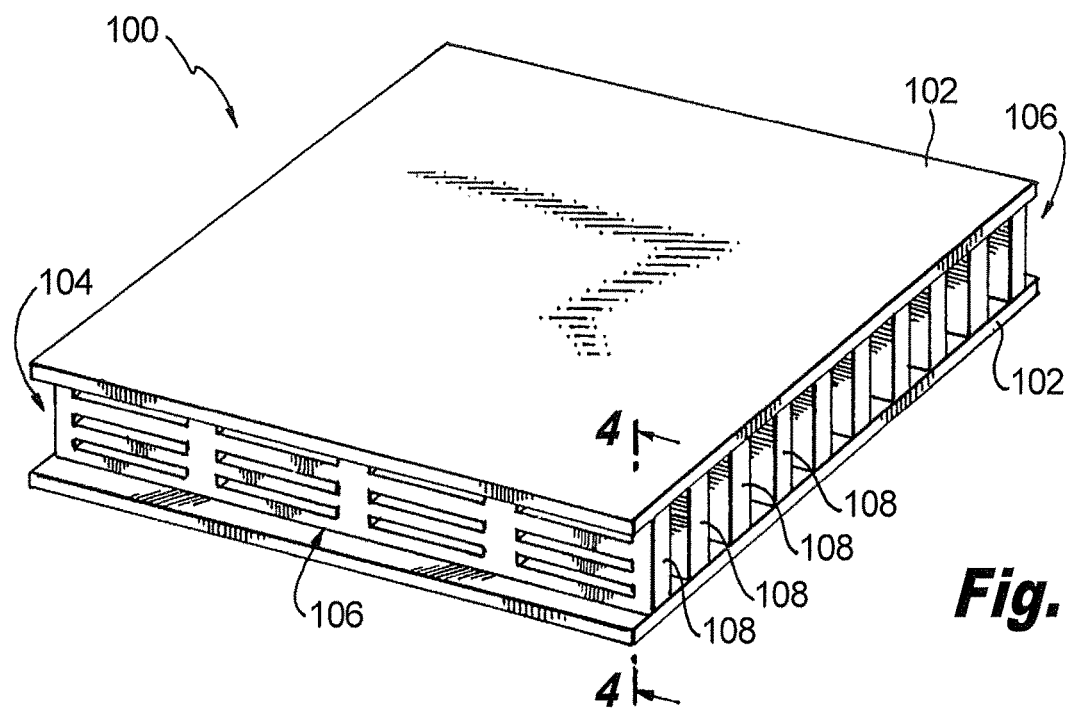
FIG. 1 is a perspective view of an exemplary embodiment of a heat exchanger constructed in accordance with the present disclosure, showing the pair of opposed, spaced apart heat exchanger plates with a plurality of heat exchanger ribs therebetween.

Reference will now be made to the drawings wherein like reference numerals identify similar structural features or aspects of the subject disclosure. For purposes of explanation and illustration, and not limitation, a partial view of an exemplary embodiment of a heat exchanger in accordance with the disclosure is shown in FIG. 1 and is designated generally by reference character 100. Other embodiments of heat exchangers in accordance with the disclosure, or aspects thereof, are provided in FIGS. 2-8, as will be described. The systems and methods described herein can be used to provide cooling such as for motor controllers or the like.

Figure 2:
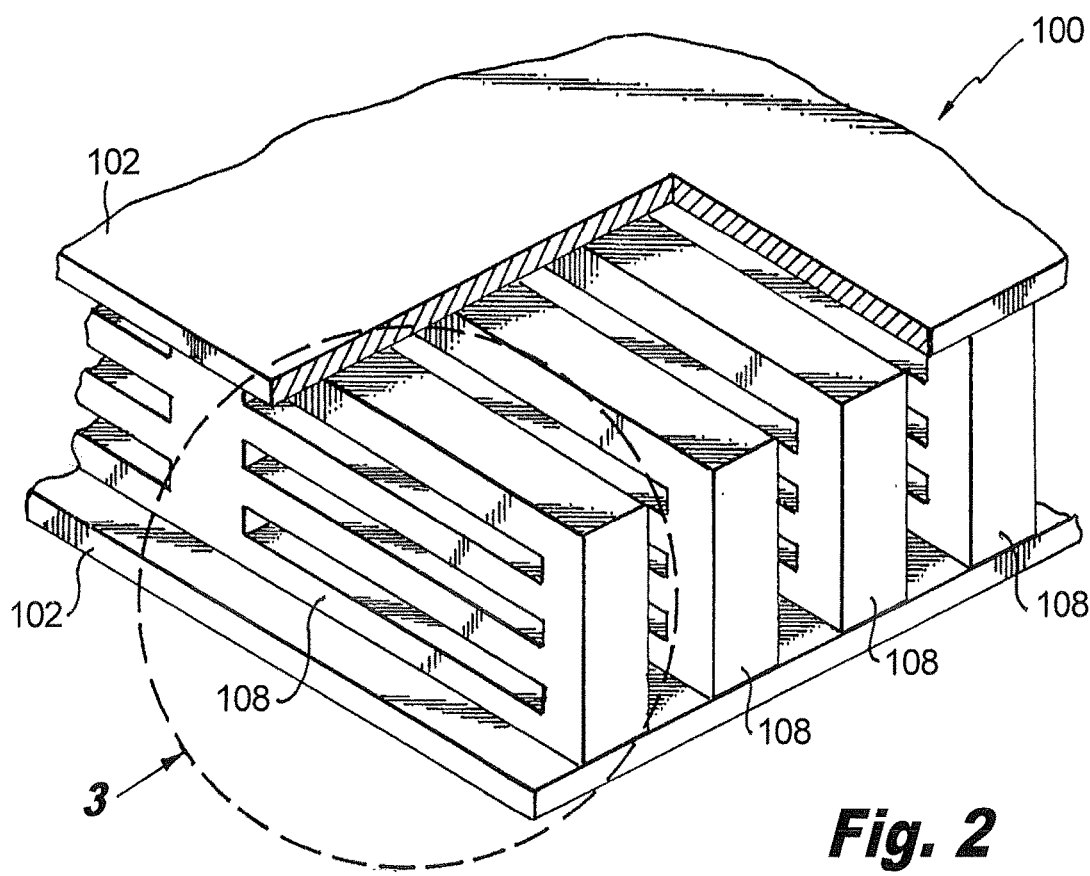
FIG. 2 is a partially cut away perspective view of the heat exchanger of FIG. 1, showing the slits defined through the heat exchanger ribs.

Heat exchanger 100 includes a pair of opposed, spaced apart heat exchanger plates 102 defining a heat exchanger volume therebetween having an inlet 104 and opposed outlet 106. A plurality of heat exchanger ribs are included within heat exchanger volume 104, each rib defining a rib body 108 that spans the heat exchanger volume vertically and laterally in one direction as oriented in FIG. 1. In FIG. 2, a portion of one of the heat exchanger plates 102 is shown removed to show more of the rib bodies 108. While no side walls are shown in FIGS. 1 and 2 for confining fluid to flow from inlet 104 to outlet 106, those skilled in the art will readily appreciate that side walls can be added, or can be formed as part of a cold plate body such as described below.

Figure 3:
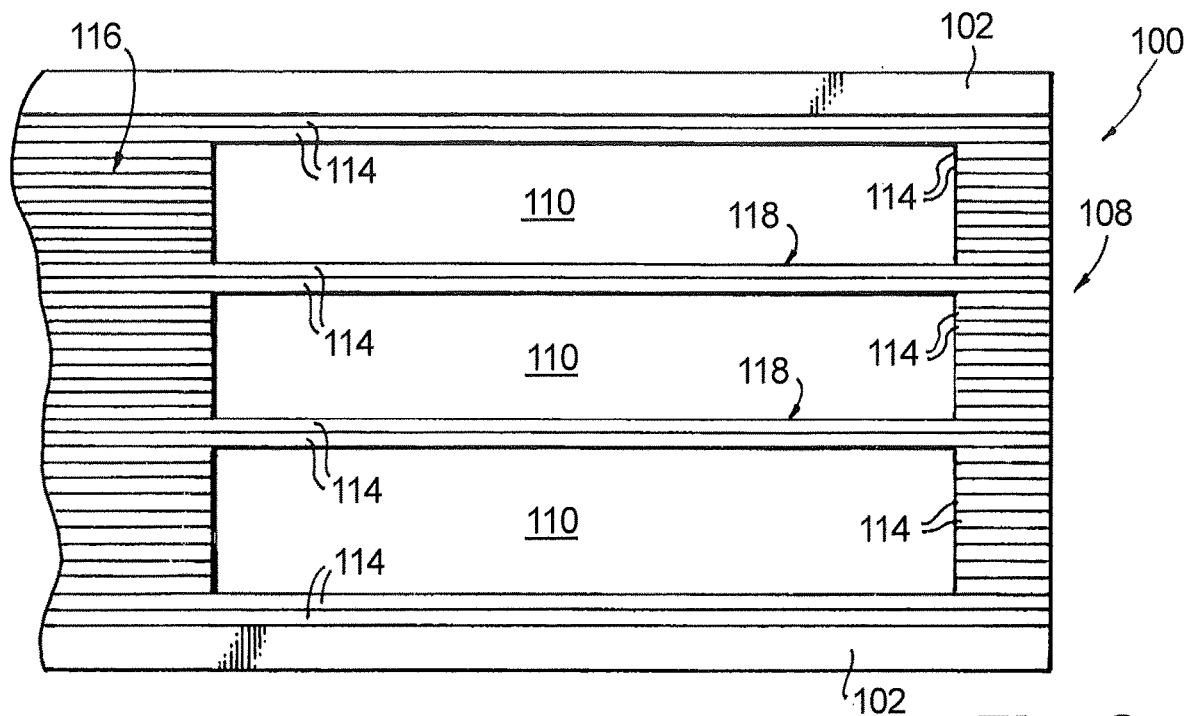
FIG. 3 is a cross-sectional inlet end elevation view of a portion of the heat exchanger indicated in FIG. 2, showing the additive manufacturing layers forming one of the ribs with slits therethrough.
Figure 4:
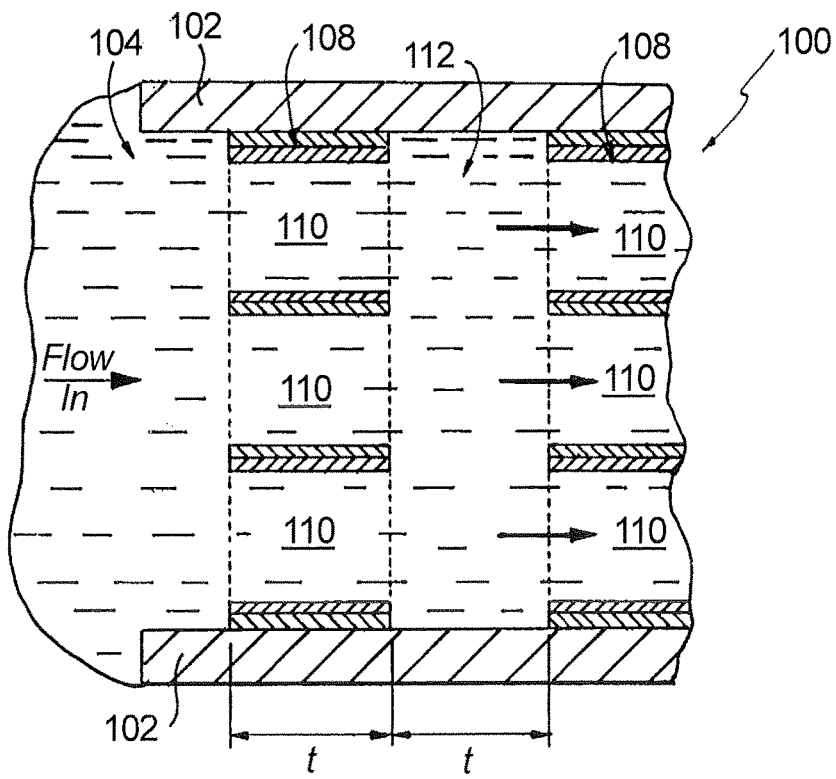
FIG. 4 is a cross-sectional side elevation view of the heat exchanger of FIG. 1, taken a the section line indicated in FIG. 1, showing the flow path for cooling fluid through the slits of the heat exchanger ribs.
Figure 5:
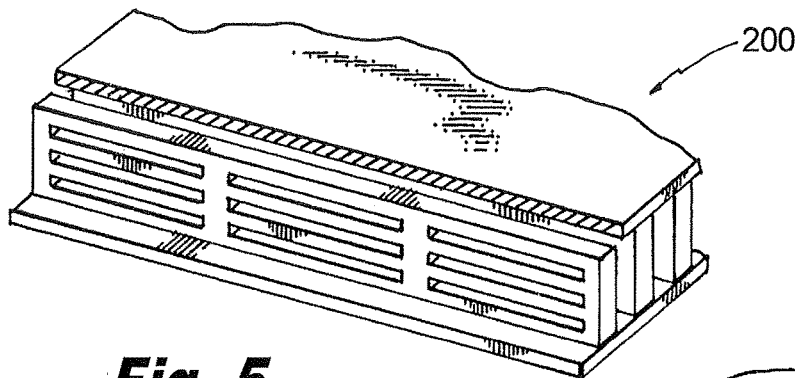
FIG. 5 is a perspective view of another exemplary embodiment of a heat exchanger, wherein the slits in each rib form a three by three array of slits.
Figure 6:
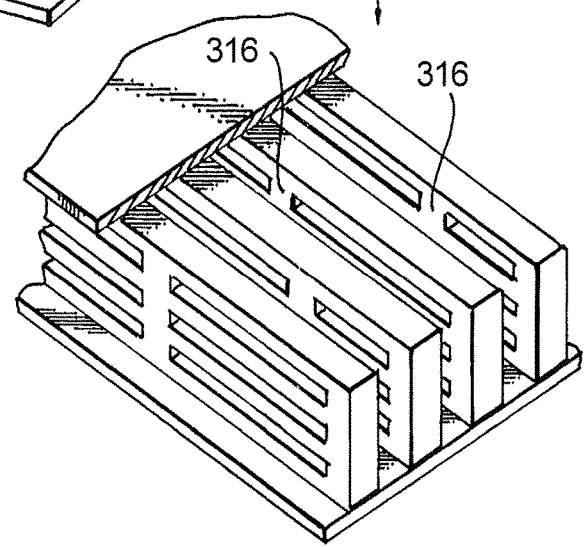
FIG. 6 is a perspective view of a portion of another exemplary embodiment of a heat exchanger, wherein the slits are misaligned from one rib to the next.

With reference now to FIG. 3, each rib body 108 includes a plurality of slits 110 therethrough to define a flow path, indicated in FIG. 4, through the heat exchanger ribs from inlet 104 to outlet 106 of the heat exchanger volume. FIG. 3 shows one rib body 108 where the flow direction is into and out of the viewing plane. In FIG. 4, the flow path is indicated schematically by flow arrows, where the flow direction is left to right. Flow enters inlet 104, passes through slits 110 in the first rib body 108 into a first plenum 112, and then alternates between successive sets of slits 110 and plena 112 until flowing out from outlet 106, which is not shown in FIG. 4, but see FIGS. 1 and 2.

Referring again to FIG. 3, each rib body 108 is made of a plurality of additive manufacturing layers 114. It should be noted that for sake of clarity layers 114 are depicted schematically in FIG. 3, and that each depicted layer 114 can itself include several physical UAM deposited layers. Each layer 114 is aligned with the flow direction defined through the slits 110 of the rib bodies 108, i.e., the flow direction indicated in FIG. 4. Layers 114 form vertical columns 116 between slits 110, as well as forming the horizontal rungs 118 between the slits 110, as oriented in FIG. 3.

Layers 114 can be formed using ultrasonic additive manufacturing (UAM). In the UAM formation of rib bodies 108, a plurality of layers 114 are successively deposited and optionally machined to form the rib bodies and slits. For example, a few metal layers can be deposited on a first heat exchanger plate, e.g., the lower heat exchanger plate 102 in FIG. 3. These first few metal layers 114 form a first level of rungs 118 for each of lower slits in each rib body 108 as oriented in FIG. 3. Plena 112, as shown in FIG. 4, can be machined out of these first layers 114. The next few layers 114 are then deposited and slits 110 and plena 112 are machined away from each layer 114. Then a few layers 114 are deposited to form the next level of rungs 118, where the layers 114 are machined to form plena 112, but are not machined for slits. This pattern can be continued until a final level of rungs is formed, e.g., the top layers 114 of rib body 108 in FIG. 3. Then a final heat exchanger plate 102 can be deposited onto the structure. Heat exchanger plates 102 can themselves be formed of multiple UAM deposited layers 114, for example. It is also contemplated that each rib body 108 can be separately formed by additive manufacturing, then heat exchanger 100 can be formed by assembling all of the rib bodies 108 into place between plates 102. In lieu of or in combination with machining successively deposited layers 114, partial UAM layers can be used with slits and/or plena already formed in the layers before deposition.

Each of the slits 110 is rectangular, and the slits 110 in each rib can define a rectangular array of slits. For example, as shown in FIG. 2, the rectangular array includes twelve substantially rectangular slits 110 longitudinally aligned in a four by three array that is four slits wide along the direction defined by the long sides of the slits 110. For sake of clarity the individual slits 110 are not indicated in FIG. 2, but see FIGS. 3 and 4. It is also contemplated that any other suitable array can be used, for example the heat exchanger 200 shown in FIG. 5 has slits in a three by three array.

As indicated in FIG. 4, each rib body 108 has a thickness t in the flow direction shown in FIG. 4, and the rib bodies 108 are spaced apart from one another in the flow direction by a distance substantially equal to the rib thickness t. In other words, each plenum 112 spans a gap that has a thickness substantially equal to the rib thickness t. Those skilled in the art will readily appreciate that any other rib thickness and spacing can be used as suitable for a given application without departing from the scope of this disclosure.

Each slit 110 in each rib body 108 is aligned with the corresponding slits 110 in each of the other rib bodies in heat exchanger 100. The vertical aspect of this alignment can be seen in FIG. 4, where the upper slits 110 are aligned to one another, the middle slits 110 are aligned to one another, and the lower slits 110 are aligned to one another. The slits 110 are also aligned in the horizontal direction, as shown in FIG. 2. Those skilled in the art will readily appreciate that this slit alignment provides for low pressure drop with a high heat transfer coefficient. In applications where more pressure drop is acceptable, heat transfer can be further enhanced by misaligning the slits. For example, in FIG. 6 heat exchanger 300 is shown with one of the plates removed to show the slits of successive ribs staggered relative to one another. This creates a flow path from each slit that impinges on the column 316 between slits of the next rib in the flow path. It is also contemplated that the rungs between slits, e.g., rungs 118 shown in FIG. 3, can similarly be out of alignment to enhance heat transfer for appropriate applications, i.e., the slits in successive ribs in the flow path can be misaligned vertically and/or horizontally.

Figure 7:
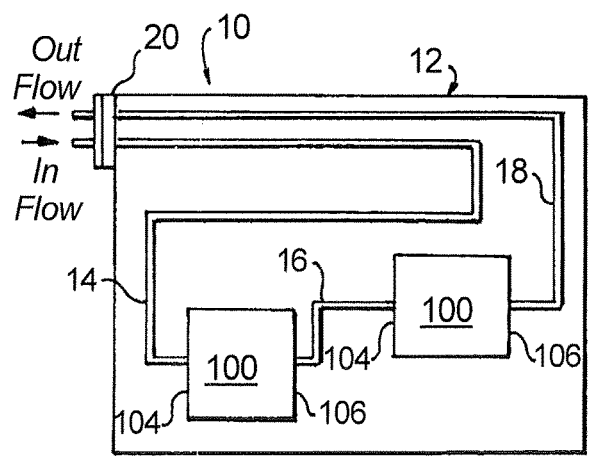
FIG. 7 is a schematic plan view of an exemplary embodiment of a cold plate including two heat exchangers such as that shown in FIG. 1 connected in series with one another.
Figure 8:
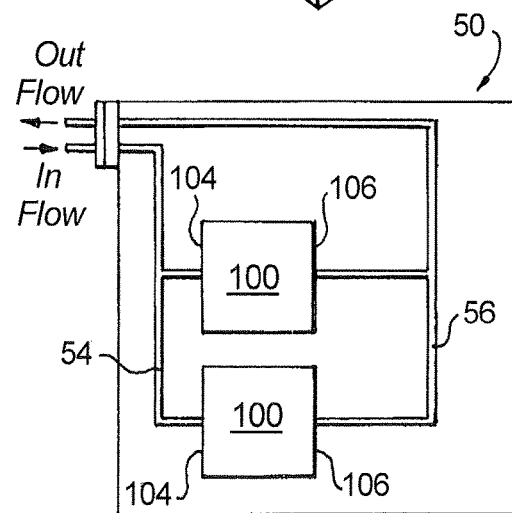
FIG. 8 is a schematic plan view of an exemplary embodiment of a cold plate including two heat exchangers such as that shown in FIG. 1 connected in parallel with one another.

With reference now to FIG. 7, a cold plate 10 for a liquid cooled motor controller includes a cold plate body 12 defining a plurality of cooling channels. A heat exchanger 100 as described above is defined in cold plate body 12 with inlet 104 of the heat exchanger in fluid communication with a first one of the cooling channels, i.e. channel 14, and with outlet 106 of heat exchanger 100 in fluid communication with a second one of the cooling channels, i.e., channel 16 for cooling of cold plate body 12 by circulation of fluid through the cooling channels and heat exchanger 100. A second heat exchanger 100 as described above is also defined in cold plate body 12 with a third one of the cooling channels, i.e., channel 18, connected in fluid communication with outlet 106 of the second heat exchanger 100. Channel 16 connects outlet 106 of the first heat exchanger 100 in fluid communication and in series with inlet 104 of the second heat exchanger 100. A connector 20, such as a quick disconnect, is included for connecting channels 14 and 18 of cold plate 10 to a supply for in flow and out flow of cooling fluid. It is also contemplated that a parallel configuration can be used. For example, in the embodiment shown in FIG. 8, cold plate 50 includes a second heat exchanger 100 connected in parallel with a first heat exchanger 100. The first cooling channel 54 is in fluid communication with the inlets 104 of both heat exchangers 100 in parallel, and second cooling channel 56 is in fluid communication with the outlets 106 of both heat exchangers 100 in parallel. Those skilled in the art will readily appreciate that any suitable number of heat exchangers 100 can be included, including solitary heat exchanger configurations, in any combination of series and/or parallel connections within a cold plate without departing from the scope of this disclosure. While it is contemplated that cold plates as described above can be used for cooling motor controllers, those skilled in the art will readily appreciate that cold plates and heat exchangers as disclosed herein can be used in any other suitable application without departing from the scope of this disclosure.

Complete heat exchangers, such as heat exchangers 100 made by additive manufacturing as described above, can be mounted to a cold plate, e.g., cold plate 10. In other words, the heat exchangers and cold plate can be formed separately and then can be joined together. It is also contemplated that the cold plate, including the channels, and heat exchanger or heat exchangers can be integrally formed together in a single additive manufacturing process, wherein at least some of the layers deposited as described above form portions of both the cold plate body and the heat exchanger or heat exchangers.

The methods and systems of the present disclosure, as described above and shown in the drawings, provide for heat exchangers with superior properties including improved performance and manufacturability. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A heat exchanger comprising:
    a pair of opposed, spaced apart heat exchanger plates defining a heat exchanger volume therebetween having an inlet and opposed outlet; and
    a plurality of heat exchanger ribs within the heat exchanger volume, each rib defining a rib body spanning the heat exchanger volume, each rib body including a plurality of slits therethrough to define a flow path through the heat exchanger ribs from the inlet to the outlet of the heat exchanger volume,
    wherein the slits in each rib define a rectangular array of slits and wherein the rectangular array includes twelve substantially rectangular slits longitudinally aligned in a four by three array four slits wide along a direction defined by long sides of the substantially rectangular slits, wherein each rib includes a plurality of additive manufacturing layers aligned with a flow direction defined through the slits thereof.

2. A heat exchanger comprising:
    a pair of opposed, spaced apart heat exchanger plates defining a heat exchanger volume therebetween having an inlet and opposed outlet; and
    a plurality of heat exchanger ribs within the heat exchanger volume, each rib defining a rib body spanning the heat exchanger volume, each rib body including a plurality of slits therethrough to define a flow path through the heat exchanger ribs from the inlet to the outlet of the heat exchanger volume,
    wherein the slits in each rib define a rectangular array of slits and wherein the rectangular array includes twelve substantially rectangular slits longitudinally aligned in a four by three array four slits wide along a direction defined by long sides of the substantially rectangular slits, wherein each rib includes a plurality of ultrasonic additive manufacturing layers aligned with a flow direction defined through the slits thereof.

3. A heat exchanger as recited in claim 1, wherein each of the slits is substantially rectangular.

4. A heat exchanger as recited in claim 2, wherein the rectangular array includes nine slits in a three by three array.

5. A heat exchanger as recited in claim 1, wherein each rib has a thickness in a flow direction defined through the slits thereof, and wherein the ribs are spaced apart from one another in the flow direction by a distance substantially equal to the rib thickness.

6. A heat exchanger as recited in claim 1, wherein each slit in each rib is aligned with a corresponding slit in each of the other ribs.

7. A heat exchanger as recited in claim 1, wherein each slit in each rib is out of alignment with a corresponding slit in adjacent ribs.

8. A cold plate for a liquid cooled motor controller comprising:
    a cold plate body defining a plurality of cooling channels, wherein a heat exchanger as recited in claim 1 is defined in the cold plate body with the inlet of the heat exchanger in fluid communication with a first one of the cooling channels and with the outlet of the heat exchanger in fluid communication with a second one of the cooling channels for cooling of the cold plate body by circulation of fluid through the cooling channels and heat exchanger, wherein each rib includes a plurality of ultrasonic additive manufacturing layers aligned with a flow direction defined through the slits thereof.

9. A cold plate as recited in claim 8, wherein the heat exchanger is a first heat exchanger and further comprising a second heat exchanger as recited in claim 1 defined in the cold plate body, with a third one of the cooling channels in fluid communication with the outlet of the second heat exchanger, and with the second one of the cooling channels connecting the outlet of the first heat exchanger in fluid communication in series with the inlet of the second heat exchanger.

10. A cold plate as recited in claim 9, wherein the heat exchanger is a first heat exchanger and further comprising a second heat exchanger as recited in claim 1 defined in the cold plate body, with the first one of the cooling channels in fluid communication with the inlets of both heat exchangers in parallel, and with the second one of the cooling channels in fluid communication with the outlets of both heat exchangers in parallel.

11. A cold plate as recited in claim 8, wherein each of the slits is substantially rectangular.

12. A cold plate as recited in claim 8, wherein each slit in each rib is aligned with a corresponding slit in each of the other ribs.

13. A cold plate as recited in claim 1, further comprising a plurality of plena within the heat exchanger volume, wherein a plenum separates adjacent rib bodies.

14. A cold plate as recited in claim 13, wherein each of the plena have a thickness equal to the thickness of the rib body.

\* \* \* \* \*